Sept. 11, 1962     D. DAYMON     3,053,248
SOLAR COOKING DEVICE AND REFLECTOR
Filed Feb. 15, 1960     5 Sheets-Sheet 1
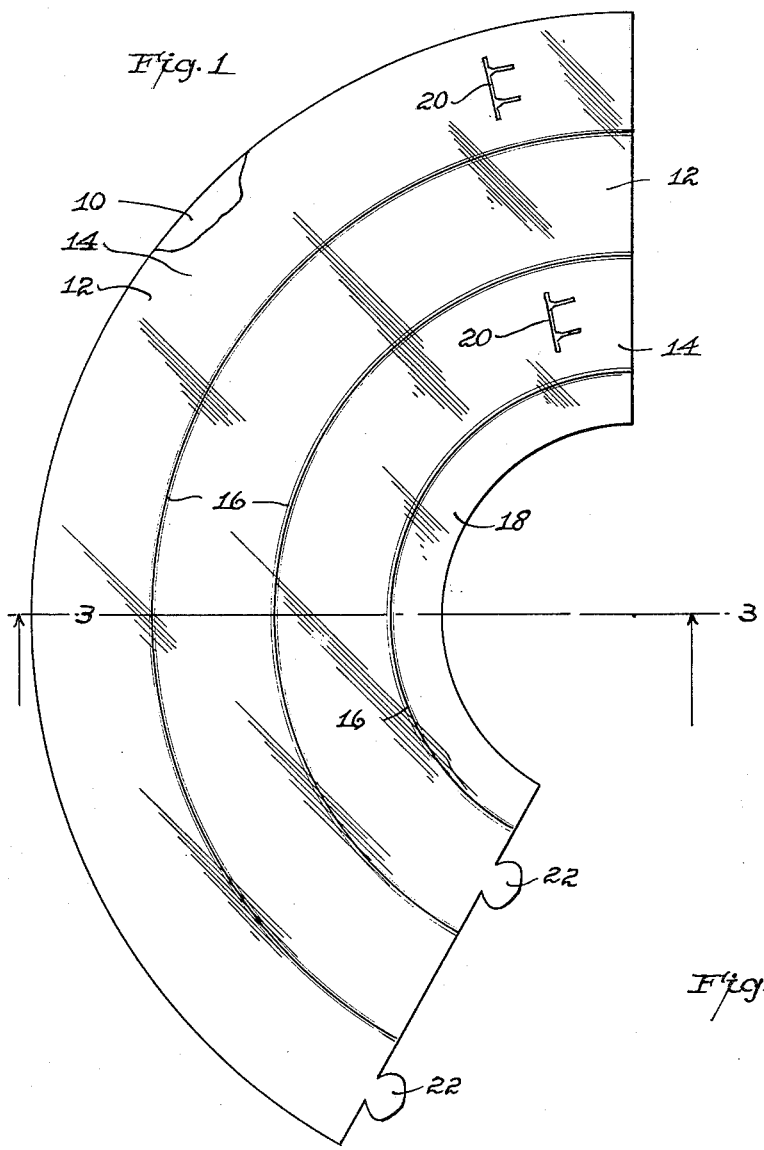
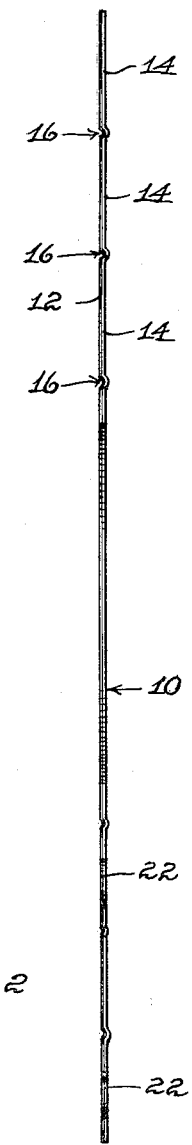
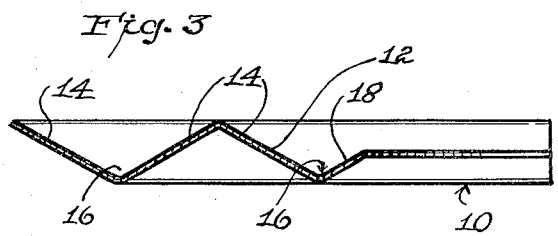
Deall Daymon
INVENTOR.
BY *J. M. Mills*
ATTORNEY

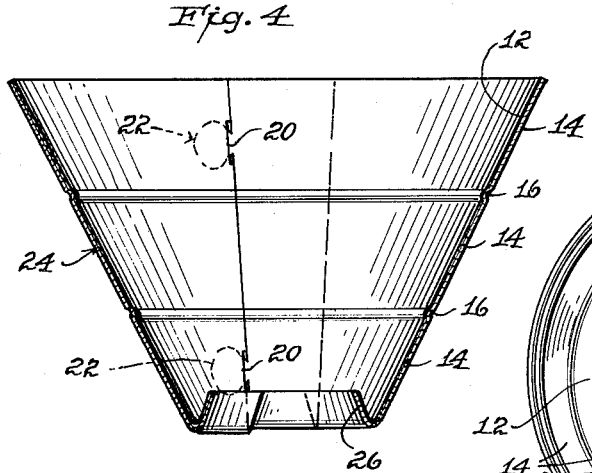
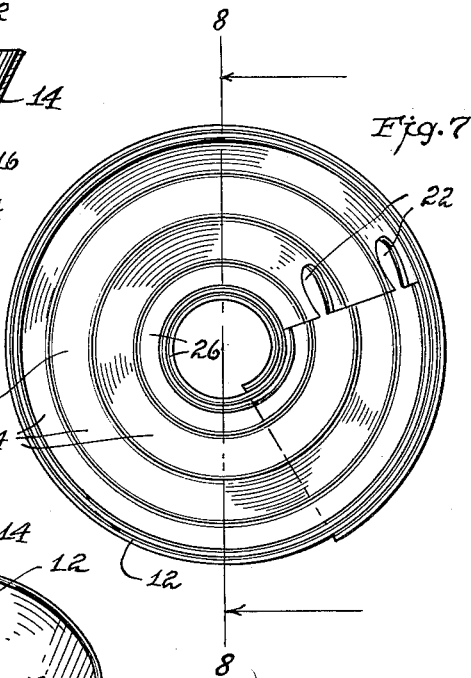
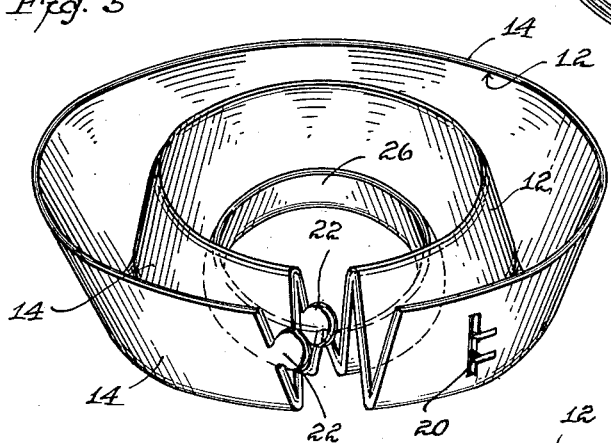
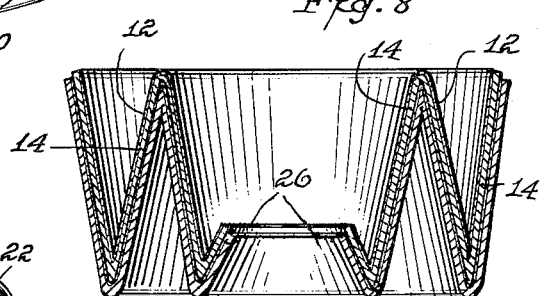
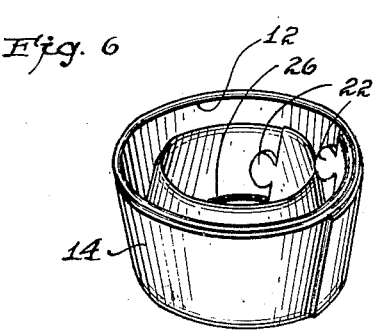
Deall Daymon
INVENTOR.

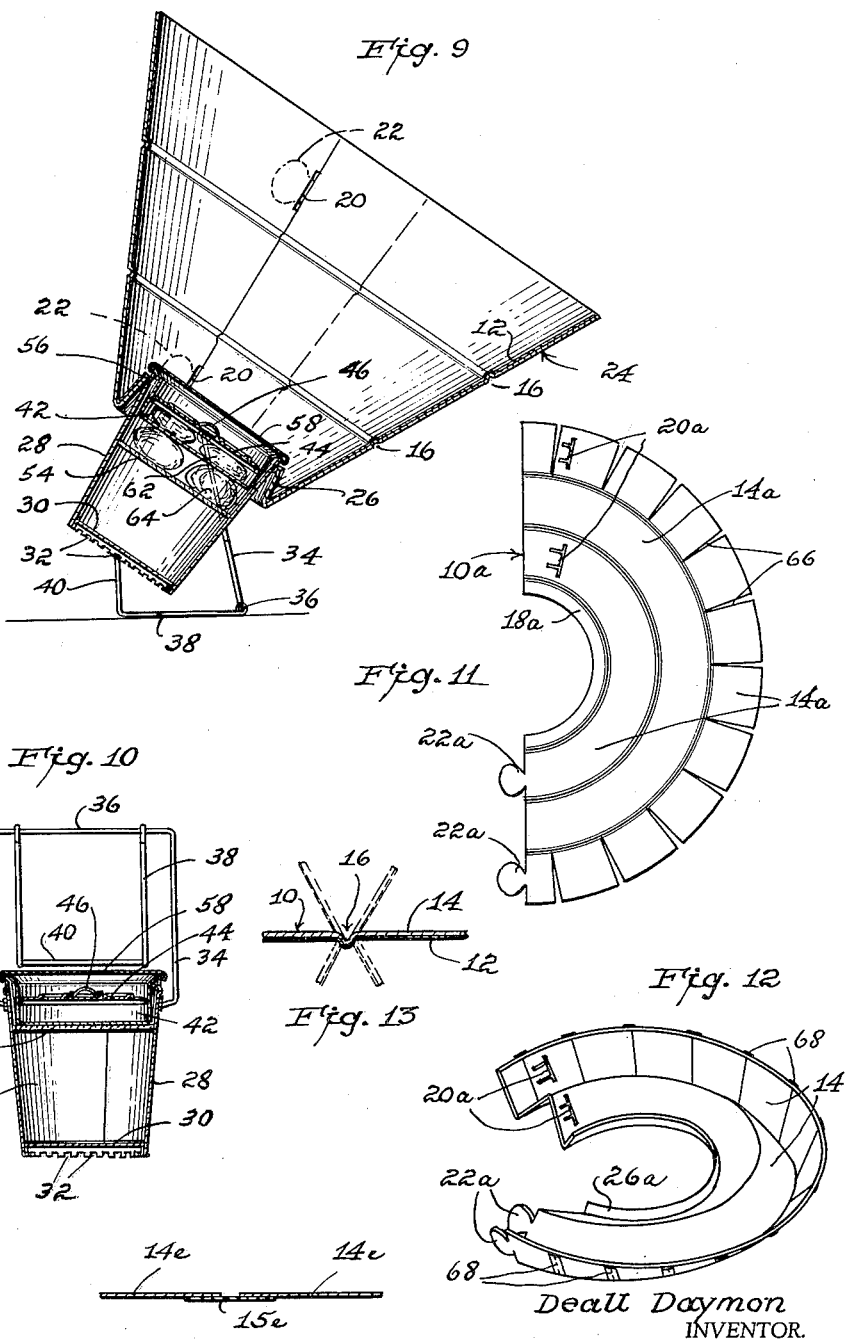

Sept. 11, 1962     D. DAYMON     3,053,248
SOLAR COOKING DEVICE AND REFLECTOR
Filed Feb. 15, 1960     5 Sheets-Sheet 4
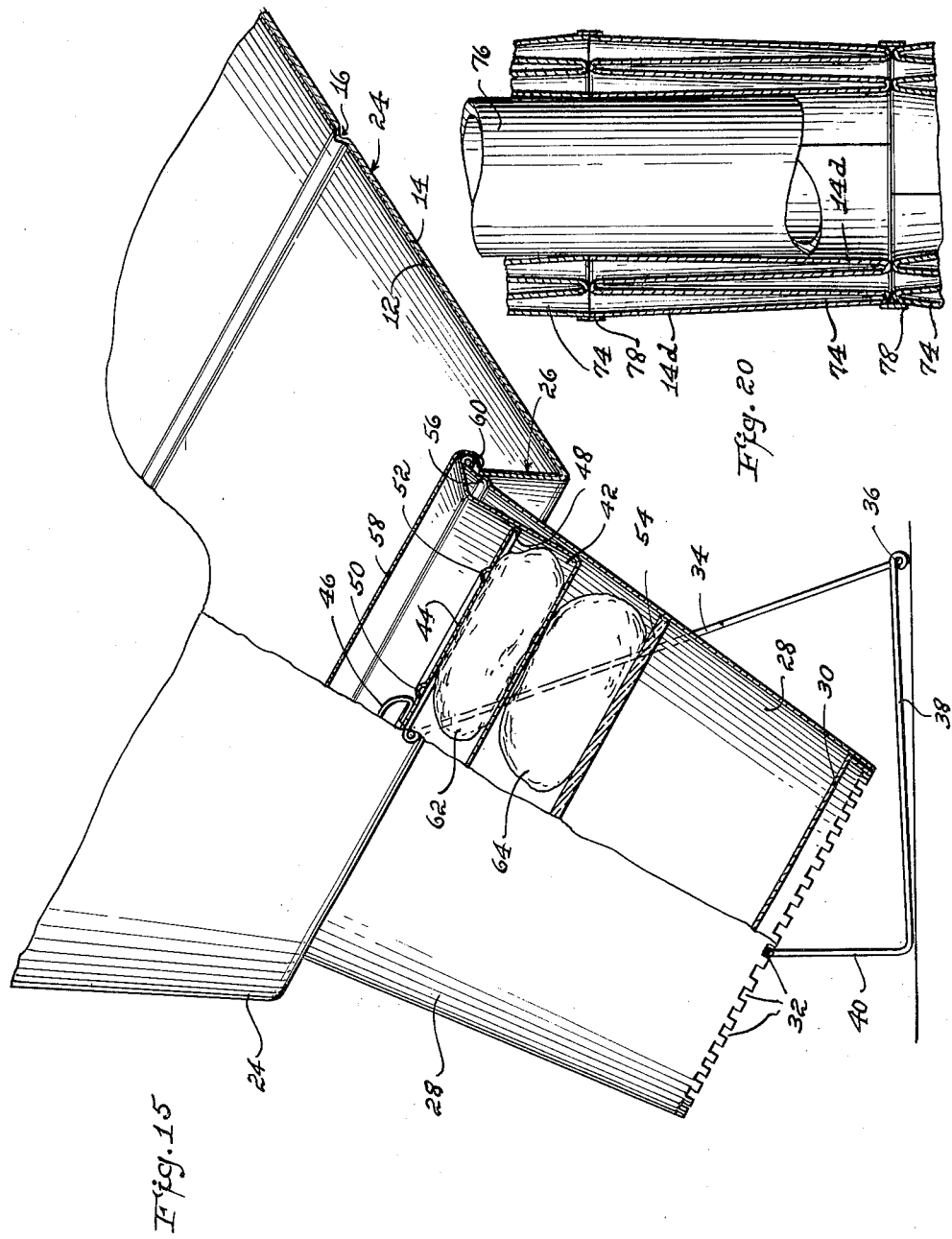
Deall Daymon
INVENTOR.
BY *J. W. Hall*
ATTORNEY

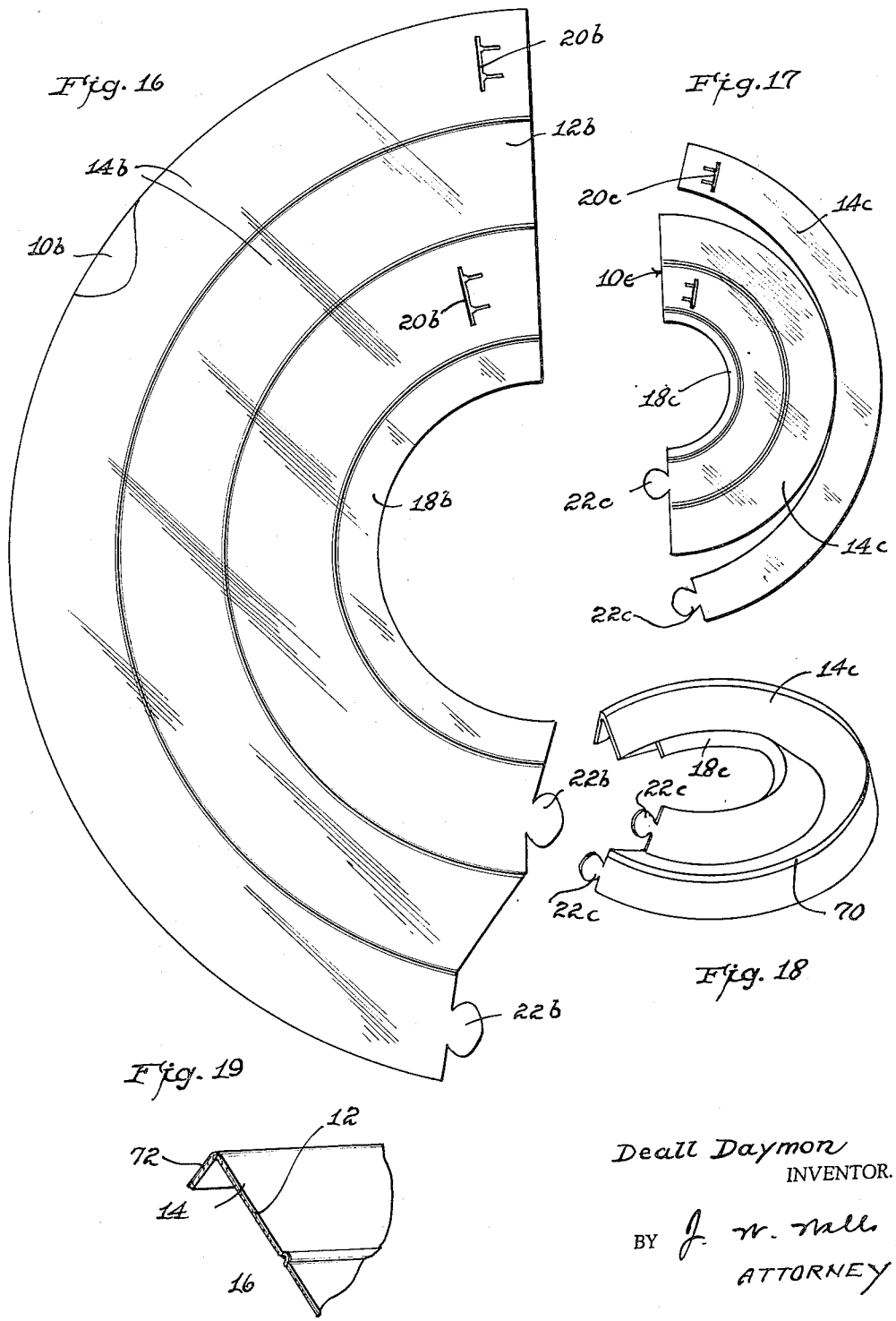

United States Patent Office 3,053,248
Patented Sept. 11, 1962

3,053,248
SOLAR COOKING DEVICE AND REFLECTOR
Deall Daymon, 11 Echo Lane, Levittown, Pa.
Filed Feb. 15, 1960, Ser. No. 8,721
11 Claims. (Cl. 126—270)

This invention relates generally to solar cooking devices or equipment and also to conic reflectors used in connection with such and for other purposes.

One of the principal objects of the present invention is to provide a portable combination outdoor solar cooking unit including a conic, pail-like shell having a cylindrical and relatively shallow cooking vessel insertable in its top portion and provided with adjustable means for supporting it on the ground in various relatively angular positions, also with an insulating disc insertable in the shell below the cooking vessel, and a reflector comprising an arcuate sheet of thin material capable of being bent into and locked in conic or polyconic form and attached to the shell in axial relation therewith, this sheet also being composed of a plurality of hinged segments which render it capable of being folded along the hinge formations in a bellows-like manner and then rolled and contracted into a relatively small conical body and nested in the bottom of the shell when the combination cooking unit is not in use. The insulating disc may then be inserted above the reflector and the cooking vessel thereafter inserted above the disc and the open top end of the shell finally closed by means of a circular transparent window which forms a part of the combination unit. The supporting means may be in the form of a wire bail for the shell having pivotaly mounted on its connecting portion a member having an outstanding portion for engagement with various pairs of notches or other means in the bottom of the shell in axially adjusting it according to the position of the sun. This member depends toward the top of the shell when the bail is used for carrying the unit.

Although my improved reflector may be formed from thin sheet metal, I have found that a very satisfactory and more economical reflector may be made from a flat sheet of cardboard or similar plastic material laminated on its inner side to aluminum or other bright metallic foil having an adequate degree of reflectivity, both having the necessary strength and flexibility in bending to enable the flat arcuate development to be readily bent into its maximum conical shape and there assume a high degree of rigidity; and to be subsequently flattened out into its original development without either breakage or appreciable permanent deformation.

The present invention permits the practical application of conic or polyconic reflectors in such devices as solar cookers and heaters in which the reflector acts as a concentrator of incoming radiant energy, and also in such devices as photographic lights or floodlights in which the reflector provides directional control and limits diffusion of outgoing energy.

Heretofore, the widespread use of large conic reflectors for the applications mentioned has been uneconomic and inconvenient because of the bulk, unwieldiness and susceptibility to damage of the cones, whether considered as a flat development or as an assembled cone. A large flexible conical development shipped in flat condition requires a container to provide support and protection. The container having an area at least twice that of the development is excessively costly; transportation costs are excessive because of the great length and width of the package, although its thickness be slight, and the excessive length, width and area of the package requires excessive shelf space and renders it unwieldy to carry about, which is inconvenient to both seller and user. On the other hand, if the reflector is assembled and shipped in its normal conical form, even more excessive container and transportation costs are incurred due to the great volume and surface area of the form and its needs for protection; and this form is still less convenient to the seller and user because of its bulk and unwieldiness.

My improved conical reflector can be rolled and folded and thereby contracted into a highly compact, rigid and self-protecting form which enables less costly packing, shipment, storage and display than previous conic reflectors, besides enabling the user to readily and conveniently transport and stow it when not in use. Since, as already mentioned, it can be fabricated from inexpensive sheets of cardboard or similar fibrous or plastic materials laminated to aluminum or other bright metallic foil it is particularly well adapted to low cost construction. This compact, low-cost, convenient reflector is particularly useful as applied to solar cooking devices in that it enables a significantly high concentration of solar radiation through the aperture in the small end of the conical reflector.

By making the segmental sections substantially wider the same folding and rolling principle can be used in forming sheets into a series of slightly conic sections of equal or opposite slope which can be advantageously adapted to various useful purposes such, for example as insulation for pipelines, lightweight, economical, reflective insulation for shipping containers and the like, it being well known that a material having a high surface reflectivity to thermal radiation can provide a substantial insulating effect to radiant heat transfer, and additionally to both radiant and convective heat transfer if multiple reflective surfaces are provided together with appropriate air spaces between the surfaces. This type of insulation requires a minimum of shipping and storage space and may be kept in flat form until the time of installation.

Other objects and advantages than those mentioned will appear or be pointed out in the following specification in which reference is had to the accompanying drawings forming a part thereof, and in which:

FIG. 1 is a plan view of one form of development or blank from which a conical reflector is made in accordance with my invention;

FIG. 2 is an edge view of the blank shown in FIG. 1;

FIG. 3 is a section taken on the line 3—3 of FIG. 1, but with the blank partially folded into segmental sections;

FIG. 4 is a sectional view of a conical reflector as made from the blank shown in the previous views;

FIG. 5 is a perspective view of the reflector shown in FIG. 4 folded and with the ends or edges in position for the beginning of the rolling operation;

FIG. 6 is a perspective view of the reflector partially rolled into compact form;

FIG. 7 is a plan view of the reflector as viewed in FIG. 6, but enlarged to double size;

FIG. 8 is a section taken on the line 8—8 of FIG. 7;

FIG. 9 is a sectional view similar to FIG. 4 and showing the reflector mounted on the cooker shell in position for use;

FIG. 10 is a sectional view of the parts shown in FIG. 9 packed for transportation;

FIG. 11 is a plan view of a modified form of reflector blank;

FIG. 12 is a perspective view of the blank shown in FIG. 11, but in partially folded condition;

FIG. 13 is a detail section showing the manner of forming a segmental hinge, as in FIG. 1;

FIG. 14 is a detail section showing a form of segmental hinge for a reflector made from sheet metal;

FIG. 15 is an enlarged elevation, partly in section, as in FIG. 9, and partly broken away, showing the solar cooker unit assembled for use;

FIG. 16 is a plan view of a modified form of reflector blank;

FIG. 17 is a plan view of another form of reflector blank;

FIG. 18 is a perspective view of the blank shown in FIG. 17 in partially folded condition;

FIG. 19 is a detail section of a reflector provided with a stiffening rim at its top; and FIG. 20 is a sectional view of a modified form of blank folded and rolled to provide an insulating section for a pipe or the like.

With respect to the drawings, it should be understood that FIGS. 1 to 6, inclusive, and FIGS. 9 and 10 are drawn to the same scale except for exaggerated thicknesses of thin parts necessitated by the small sizes of certain views; and FIGS. 7 and 8 are drawn to a scale double that of the views mentioned within the limitations referred to. It should be further understood that in FIG. 10 the reflector is shown rolled into more compact condition than as in FIG. 6.

Referring to the drawings in which like numerals designate like parts or features in the several views and particularly to FIGS. 1 to 10 and to FIGS. 13 and 15, the numeral 10 designates a flat, arcuate development or blank which may be made of thin cardboard or similar plastic or other suitable sheet material laminated on one side to a sheet of aluminum or other bright metallic foil 12. The laminated sheet is divided into a plurality of segmental sections 14 by scoring or other hinge formations as at 16 to render the sheet easily foldable in a bellows-like manner and back again to flat condition without damage to the sheet as a whole. As shown in FIG. 1 the outer segmental sections 14 are of substantially uniform width and may be folded into angular relation, as indicated in FIG. 3 and FIG. 5. A narrower segmental section 18 is formed on the inner side of the sheet for a purpose hereinafter described. The outer and inner wider sections are provided with slots 20 in one end portion of the sheets 10 and 12, and with tabs 22 on the opposite end for insertion in the slots to lock the sheets in the form of a truncated cone 24 with the narrow segmental portion 18 forming an annular flange 26, as shown in FIG. 4.

As shown in FIGS. 5, 6, 7 and 8 the ends of the folded sheet 10, with the laminated sheet of foil may be folded in a bellows-like manner, or into interconnected V and reverse V formations, then bent until the ends of the folded sheet are brought into telescopic relation and then rolled into a compact conic form, as shown partially rolled and folded in FIGS. 6, 7 and 8.

The complete solar cooking device or unit includes a shell 28, in the form of a conical pail, as shown in FIGS. 9, 10 and 15. This shell is open at its top end and has a closure 30 a short distance from its bottom end, which is provided with a series of notches 32. The shell 28 is also provided with a bail 34 for convenience in carrying it, and pivotally mounted on the connecting portion 36 of this bail is a ground supporting stand 38 having an angular cross portion 40 spanning the bottom of the shell for engagement with selected opposed pairs of the notches 32 in adjusting the axial angle of the shell in relation to the ground according to the location of the sun. The wall of the shell 28 is outwardly rolled at its upper end to provide a seat for an outwardly flared portion of a shallow cylindrical cooking vessel 42, which is provided with an axially adjustable lid or closure 44 having a central loop handle 46 and a depending curved outer flange 48. The close fit of the lid 44 within the vessel 42 provides sufficient frictional resistance to enable the entire vessel and contents to be lifted from the shell 28 by means of the handle 46, but it can be forcibly withdrawn from or axially adjusted within the vessel. The lid 44 has a circular bead 50 around its center which serves not only as a reinforcement for the thin lid, but also as an indicator in aiming the shell at the sun, as will be further described.

The lid may also have another reinforcing bead 52 toward its periphery.

An insulating disc 54 is sized to fit tightly in the intermediate portion of the shell 28, leaving space not only for the cooking vessel but also for rolls or other food items to be heated below the cooking vessel. The upper wall of the shell 28 has a bead 56 slightly below the open end of the shell. This bead forms a seat for the free end of the flange 26 in supporting the reflector cone 24 in axial relation on the shell, as more clearly shown in FIG. 15. After the insulating disc 54 and the cooking vessel with its food contents and lid have been placed in the shell a transparent window 58, made of plastic or other suitable material, and having a depending corrugated skirt or rim 60 is snapped over the end of the shell. When the shell 28 has been directed toward the sun the conical configuration of the reflector cone 24 provides a rapidly increasing radiant flux density toward the center of the window 58. This creates a small circular bright spot on the lid 44 and can be used as an indicator in aiming the shell axially at the sun. The shell 28 is attached to the reflector 24 by inserting it, small end first, through the annular flange 26 until the bead 56 snaps past the free end of that flange. This effects a firm anchorage between the reflector and shell in axial relation.

As more clearly shown in FIG. 15, food items 62 for thorough cooking are placed in the cooking vessel 42, and other items 64 may be placed in the space between the insulating disc 54 and the cooking vessel to be mildly cooked or heated.

After the food has been cooked and removed from the shell 28 the reflector 24 is removed from the shell by forcing it downwardly to spring the end of flange 26 over the bead 56, and then lifting the shell. The insulating disc is then removed after which the reflector is rolled into sufficient compactness to fit in the bottom portion of the shell, as shown in FIG. 10. Then the insulator disc and cooking vessel, with its lid, are replaced in order in the shell, and the transparent window 58 snapped on the open end of the shell, as also shown in FIG. 10. The bail 34 may then be lifted into carrying position with the supporting stand 38 suspended from the connecting portion, as also shown in FIG. 10. The rolled reflector 24 is shown on the same scale as in FIG. 6, but rolled into a lesser diameter to fit in the shell. As shown in FIG. 13, the scoring 16 permits the segmental sections 14 to be folded in either direction.

The modified form of blank 10a shown in FIG. 11 is substantially the same as the form shown in FIG. 1 except that the outer segmental section is provided with outwardly diverging slits 66, the edges of which are brought together when the blank is folded and secured together by adhesive strips 68, or other suitable means, to form a polyconic reflector, which in approaching a parabolic form is capable of producing higher radiant fluxes than simple conic reflectors. The blank illustrated can be rolled into compact form in the same manner as that of FIG. 1.

The modified form of blank 10b shown in FIG. 16 is also the same as that of FIG. 1 except that the tab 22b on the end of the outer segmental section is set inwardly to reduce the lap of the edge portions in the assembled reflector.

The modified form of blank 10c shown in FIG. 17 is the same as that of FIG. 1 except that the outer segmental section 14c is of a greater radius than the two inner sections as another means of forming a polyconic reflector. As shown in FIG. 18 the spaced edges of the outer and the first inner section may be secured together by an adhesive strip 70 or other suitable means.

The detail view FIG. 19 shows an outer stiffening rim 72 added to the outer segmental section 14 of FIG. 1, or either of the modified forms described.

In the form of reflector blank shown in FIG. 14 the segmental sections 14e may be formed separately of thin sheet metal having a bright surface and hingedly secured together at their edges by adhesive strips 15e or by other suitable means.

In FIG. 20 is shown another modified form of development 14d of the same general character as the forms already described in that it can be folded and rolled into tapered tubular form. However the segmental sections are made of greater width in this form to provide insulating units 74 for cylindrical objects such as pipes 76, lightweight reflective insulation for shipping containers and the like, as previously mentioned. A cardboard or plastic sheet for each unit may be laminated on both sides with a bright metal foil (not shown in FIG. 20) to provide a pipe or other cylindrical object with multiple reflective insulating surfaces and the slightly conical formation of the segmental sections provide adequate air spaces between the surfaces, thus affording a substantial insulating effect to radiant and convective heat transfer. The free ends of the sheet when folded into bellows-like form may be telescoped together in the same manner as that of the other forms described, so that the unit can be rolled or unrolled to fit pipes or other cylindrical objects of various diameters. Also the ends of the rolled units of corresponding diameter may be abutted together, as shown, to provide a continuous length of insulation. The locking tabs, such as the tabs 22 of FIG. 1, may be omitted in this modified form and the unit secured in rolled condition by bands 78 or other suitable means.

As previously mentioned the other reflectors described may be used for various purposes other than for solar cookers or heaters, such, for example, as for photographic lights or floodlights and the like. Also, as many segmental sections as desired may be used in making conic reflectors of various lengths and tapered to any desired angle.

The arcuate sheet may be made of a plastic material and bright surfaces imparted to one or both sides by forming a metallic film thereon, thereby dispensing of the lamination with metallic foil.

From the foregoing description it will be seen that applicant's reflector blank is of a structural material, which is resilient and flexible to the extent that it can be bent substantially along any one axis, within the elastic limit, without failure or permanent deformation. As a structural material it is self-supporting as a reflector, requiring no additional skeleton or struts. Concentricity of the reflector with the shell 28 is ensured by engagement of the frustum of the cone with the shell, which also ensures that the reflector when installed on the shell will be circular in cross-section.

It will be seen further that the arcuate hinge formations, such as those designated by numeral 16, do not affect the rigidity of the extended reflector, for the reason that, being at all points parallel to the flexing axis, they cannot "work." When, however, commencing from the flat blank, they are started in alternatively opposite directions they permit the collapsing action as hereinbefore described. In collapsing, the material is not required to be "warped" or flexed along more than one axis. Therefore, the arcuate hinges provide collapsibility in conjunction with a structural material and stable structural form.

It should, therefore, be understood that applicant's reflector structure, utilizing arcuate hinges, achieves self-support and stability of form on the one hand, combined with extreme collapsibility on the other hand.

Obviously, various modifications or changes may be made in my improved solar cooking device and reflector without departing from the spirit and scope of my invention. Therefore, it should be understood that the embodiments of my invention shown and described are intended to be illustrative only, and restricted only by the appended claims.

I claim:

1. A solar cooking device comprising, in combination, a truncated, upwardly divergent conical shell open at its top and closed at its bottom end, a stand having means coengageable with means on the bottom of said shell for supporting said shell on the ground at various axial angles thereto, a cylindrical cooking vessel insertable in and having means for suspending it from the wall of said shell; and a truncated, upwardly divergent conical reflector of substantially greater length and major diameter than the corresponding dimensions of said shell, said shell projecting through the bottom, smaller, end of said reflector, said reflector having a bright inner surface and having means at its smaller end for attaching it to the wall of said shell near the top end of said shell in axial relation therewith, for the support by said shell of said reflector, said reflector being formed from a flat arcuate sheet of resilient material having means for attaching the ends of the sheet together in overlapping relation in conical form and also having a plurality of spaced concentric rows of hinge formations enabling the flat sheet to be folded along said rows into interconnected V and reverse V formations, the ends of which can be telescoped into each other and the formations thereafter rolled and telescopically folded and contracted into a conical form of sufficient compactness to be insertable in said shell below said cooking vessel when the latter is suspended in the shell.

2. A solar cooking device as in claim 1 and including a circular lid for the cooking vessel, having a handle projecting from its top surface, said lid being insertable in said vessel with sufficient wedging relation therewith as to enable the entire cooking vessel to be lifted by means of said handle.

3. A solar cooking device as in claim 1 and including an insulating disc of a diameter to engage the wall of the shell in wedging relation in a plane substantially below the cooking vessel when the latter is suspended in the shell.

4. A solar cooking device as in claim 1 in which the means for suspending the cooking vessel in the shell consists of a lateral flange surrounding the top of the vessel for seating on the top of the shell.

5. A solar cooking device as in claim 1 in which the means for attaching the reflector to the shell consists of an upturned flange at the small end of the reflector and an annular bead projecting from the outer wall of the shell, the end of the flange being seatable on said bead.

6. A solar cooking device as in claim 1 in which the means for supporting the shell on the ground consists of a bail for said shell and an adjustable member pivotally mounted on the connecting portion of said bail, said member being engageable with notches in the bottom periphery of the shell.

7. A solar cooking device as in claim 1 in which the bright inner surface of the reflector is provided by a bright metal foil laminated to the surface of the sheet from which the reflector is formed.

8. A solar cooking device as in claim 1 and including a transparent circular window provided with means for attaching it to the top of the shell.

9. A solar cooking device as in claim 1 in which the shell is cylindrical.

10. A solar heating device comprising, in combination, a receptacle circular in cross-section, a stand having means coengageable with means on the bottom of said receptacle for supporting said receptacle on the ground at various axial angles thereto; and a truncated, upwardly divergent conical reflector of substantially greater length and major diameter than the length and diameter of said receptacle, said reflector having a bright inner surface and having means at its smaller end for attaching it to the wall of said receptacle in axial relation therewith, for the support by said shell of said reflector, said reflector being formed from a flat arcuate sheet of resilient material having means for attaching the ends of the sheet together in overlapping relation in conical form and also having a plurality of spaced concentric rows of hinge formations enabling the flat sheet to be folded along said rows into interconnected V and reverse V formations the ends of which can be telescoped into each other and the formations thereafter rolled and telescopically folded and contracted into a conical form of sufficient compactness to be insertable in said receptacle for storage therein.

11. A solar heating device as in claim 10 in which said receptacle is of truncated, upwardly divergent formation, in which said receptacle projects through the bottom, smaller end of said reflector, and in which the means at the smaller end of the reflector for attaching it to the wall of the receptacle engages said wall near the top end of said receptacle.

References Cited in the file of this patent

UNITED STATES PATENTS

| | | |
|---|---|---|
| 1,196,523 | Clark | Aug. 29, 1916 |
| 2,205,860 | Olds | June 25, 1940 |
| 2,308,009 | Hood et al. | Jan. 12, 1943 |
| 2,770,230 | Tarcici | Nov. 13, 1956 |
| 2,806,135 | Bolsey | Sept. 10, 1957 |
| 2,909,171 | Lof | Oct. 20, 1959 |

FOREIGN PATENTS

| | | |
|---|---|---|
| 512,526 | France | Oct. 15, 1920 |